United States Patent [19]

Konrad

[11] 4,375,603
[45] Mar. 1, 1983

[54] SHUNT-WOUND CONTROL FOR ON-ROAD VEHICLE

[75] Inventor: Charles E. Konrad, Roanoke, Va.

[73] Assignee: General Electric Company, Salem, Va.

[21] Appl. No.: 265,527

[22] Filed: May 20, 1981

[51] Int. Cl.³ .......................... H02P 5/06; H02P 5/28; H02P 7/06
[52] U.S. Cl. .................................. 318/139; 318/338; 318/376
[58] Field of Search ................ 318/139, 331, 338, 376

[56] References Cited

U.S. PATENT DOCUMENTS

| 2,997,607 | 8/1961 | Hill | 307/146 |
|---|---|---|---|
| 4,330,742 | 5/1982 | Reimers | 318/376 |
| 4,334,177 | 6/1982 | Lund | 318/338 |

Primary Examiner—B. Dobeck
Assistant Examiner—A. Evans
Attorney, Agent, or Firm—James H. Beusse; Ormand R. Austin; Arnold E. Renner

[57] ABSTRACT

A power control system for a DC electric motor includes a control power regulating means which selectively connects either the armature of the motor, the field winding of the motor or both in a series current path with a DC power source permits operation of the motor in either an armature current or field current control mode using a single regulating circuit. In the field current control mode a contactor connects the armature of the motor directly across the power source and the regulating circuit controls the field current to regulate torque developed by the motor. The armature circuit and field circuit are interconnected by a diode which permits electronic switching between armature current control and field current control modes of operation.

10 Claims, 9 Drawing Figures

SHUNT-WOUND CONTROL FOR ON-ROAD VEHICLE

The present invention is directed to a propulsion system for an electric vehicle and, more particularly, to a shunt wound direct current motor propulsion system for an electric vehicle.

Electrically propelled vehicles are in use in numerous applications. For example, fixed rail transit vehicle and locomotives are typically propelled by electric motors as are various types of off-highway vehicles in the mining industry. Electric power for these types of vehicles is provided by external sources or by on-board engines and generator sets. Thus, the range of velocity and horsepower developed by these vehicles is controlled to a large extent by a virtually unlimited power source which permits use of large series-wound direct current (DC) motors to provide tractive effort.

In some classes of vehicles, such as, for example, fork lift trucks or jitneys, the power source is limited to batteries because the size of the vehicle must be kept relatively small while permitting maximum mobility. These vehicles also utilize series-wound DC motors since such motors provide the torque/speed characteristics necessary for moving materials. However, the characteristics of the series-wound DC motor are not advantageous for battery powered on-road vehicles, such as small automobiles, since the limited power source and size of the DC motor limit operation at highway speeds. Incorporating a multi-gear transmission enables higher speeds to be achieved but creates more difficult motor control problems. In recognition of these problems, it has been proposed to utilize shunt-wound DC motors for on-road vehicles.

One of the early shunt-wound motor control systems provided separate controls for armature current and for field current. In starting from zero speed, the field control brought field current up to its maximum value and then armature current control was used to increase armature voltage to its maximum value. Speed was increased above that established by full motor current by gradually reducing field current while holding armature voltage constant. The primary difficulty with this scheme is that two separate controls, i.e., one for field control and one for armature control are required. Furthermore, the armature control has to support full armature current at all times requiring high current capability at higher cost.

Although it is desirable to operate the shunt wound motor with full voltage on the armature, suddenly connecting the armature to the voltage source, as by use of a contactor, can result in flashing of the armature and attendant damage. An alternate approach is to insert an impedance in series with the armature to thereby limit in-rush current and voltage. The impedance can be shunted by a contactor which is closed when armature counter electromotive force (CEMF) reaches approximately source voltage. Due to the rather large magnitude of armature current, the impedance in the armature current path must dissipate a relatively large amount of power in the form of heat and thus tends to be relatively costly.

It is an object of the present invention to provide an improved power circuit for a shunt wound DC motor.

It is a further object of the present invention to provide a power control system for a shunt wound DC motor which incorporates both armature current control and field current control using a single current regulator circuit.

BRIEF SUMMARY OF THE INVENTION

In accordance with the present invention, a shunt wound DC electric motor providing tractive effort to an on-road vehicle is controlled by a single time ratio or chopper circuit which initially controls power to both the motor field and armature. In one aspect of the invention the motor armature is connected in series with a diode and the series combination of diode and armature is connected in parallel with the motor field. A chopper circuit connects the motor field and armature to a source of DC potential. A switch is provided to connect the armature directly to the DC source when armature CEMF reaches substantially DC source potential. At start-up of the vehicle, motor current is controlled by gradually phasing the chopper circuit toward 100 percent conduction. Initially, armature current builds up faster than field current since armature impedance is lower. Once the chopper circuit reaches 100 percent on-time, the switch is closed to connect the armature directly to the DC source. Speed is increased above the full current level by phasing the chopper circuit back to reduce field current. In those vehicles including a transmission, shifting to a higher gear is accomplished by increasing field current to its maximum value while shifting so that the velocity of the motor slows to accommodate the higher gear. Field current is thereafter gradually reduced to increase vehicle velocity.

In one embodiment additional starting torque is provided by having a split field winding with one portion of the field winding being connected through a switch across the DC source whereby minimum fixed field excitation is provided. The balance of the field winding is connected to the chopper circuit which thereby regulates field excitation.

DESCRIPTION OF THE DRAWINGS

For a better understanding of the objects, features and advantages of the present invention, reference may be had to the following detailed description taken in conjunction with the appended drawings in which.

DETAILED DESCRIPTION

Figure 1:
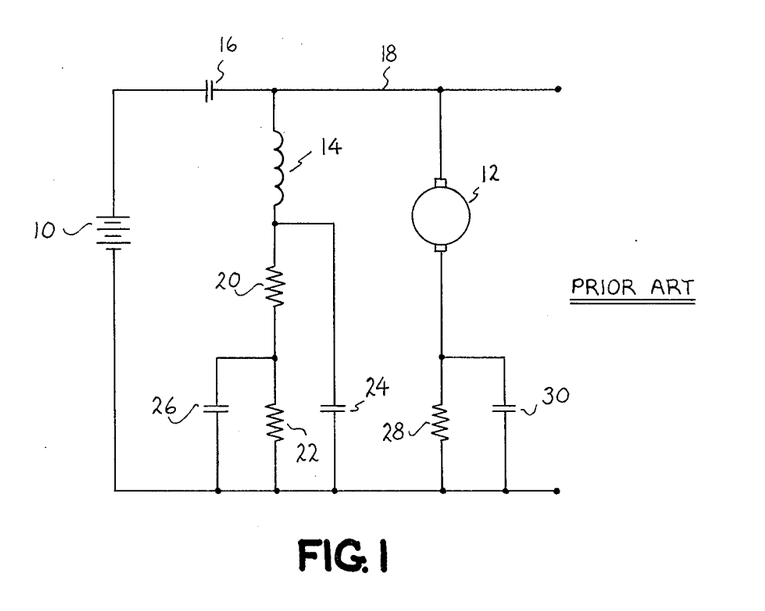
FIG. 1 is a simplified schematic of a prior art shunt motor power control system.

Referring now to FIG. 1, there is shown a simplified diagram of a typical prior art resistor control, shunt motor speed regulator wherein motor field current is controlled in three current steps. A battery 10 supplies excitation to a shunt wound motor comprising an armature 12 and a field winding 14. A positive terminal of the battery 10 is connected through electromechanical contacts 16 to a relatively positive bus 18 to which is connected one terminal of each of the field winding 14 and armature 12. A second terminal of the field winding 14 is connected through the series combination of resistor 20 and resistor 22 to a negative terminal of battery 10. Electromechanical contacts 24 connected between the second terminal of field winding 14 and the negative battery terminal permits both resistors 20 and 22 to be shunted. Electromechanical contacts 26 connected from the junction intermediate resistors 20 and 22 to the negative battery terminal permits the resistor 22 to be bypassed. A second terminal of the armature 12 is connected to the negative battery terminal through a resistor 28, which resistor is also shunted by electromechanical contactors 30 connected in parallel therewith.

The efficiency of a shunt motor demands that the armature resistance be relatively small. Hence, any time the armature is connected in a way that the generated terminal voltage (counter electromotive force or CEMF) is significantly different from the battery voltage, then the armature current could be excessive with the risk of flashing the commutator or damaging the motor. Thus, the resistor 28 is placed in series with the armature 12 to limit the current at initial turn-on. In the illustrated system of FIG. 1, when the contacts 16 are first closed, the contacts 24 and 26 are both closed and the contacts 30 are open. This arrangement limits armature current while allowing field current to build toward its maximum value and generate maximum torque in the machine. Once the counter EMF of the armature has risen to about battery potential, the contacts 30 are closed so that battery 10 is connected directly across the armature 12. Armature velocity is increased above its base velocity at full field excitation by first opening the contacts 24 so that the resistor 20 appears in the field current path to thereby reduce field current and "weaken" the field generated flux. An additional step of field weakening and thus velocity increase is thereafter obtained by opening the contacts 26 so that both resistor 20 and resistor 22 are then in the field current path. It will, of course, be apparent that by replacing the two resistors 20 and 22 with a continuous current regulator, the field current can be linearly varied over its full operational range.

Figure 2:
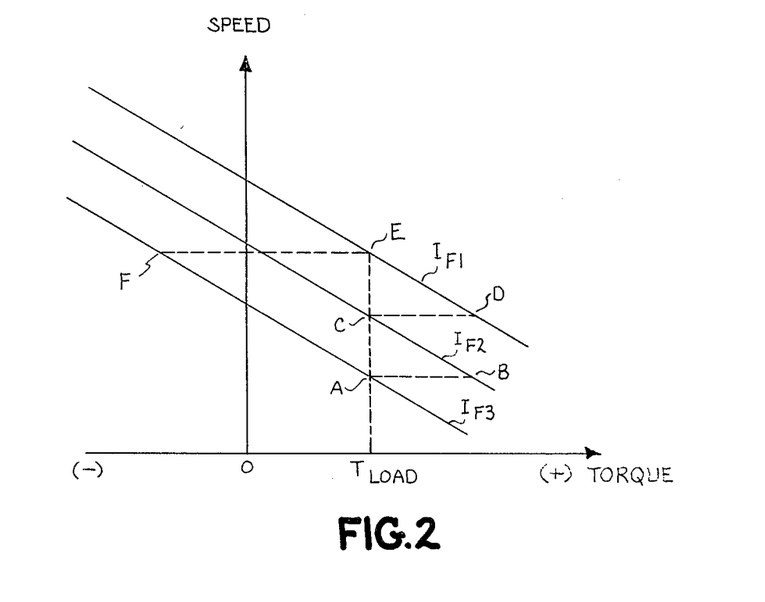
FIG. 2 is a graph of speed versus torque for the motor system illustrated in FIG. 1.

Referring now to FIG. 2, there is shown a typical set of torque/speed characteristics for a shunt motor with three different levels of field excitation such as that shown in FIG. 1. The vertical axis represents speed and the horizontal axis represents torque wherein that portion of the graph to the right of the zero torque line represents positive or motoring torque and that portion of the graph to the left of the zero torque line represents negative or braking torque. Braking torque occurs when the motor is operating as a generator and requires some driving energy input to keep it running. The characteristic labeled $I_{F1}$ represents the lowest magnitude of field current, i.e., that field current which would be obtained with both resistors 20 and 22 connected in series with the field winding 14. The characteristic label $I_{F2}$ is an intermediate field current level obtained by connecting the one resistor 20 in series with the field winding 14. The characteristic label $I_{F3}$ represents the maximum field current condition wherein both contacts 26 and contacts 24 are closed to obtain maximum flux from field 14.

If the motor is being driven with maximum flux density so that operation is along the characteristic labeled $I_{F3}$, and if a driving load is applied having a torque requirement indicated at $T_{Load}$, the motor would be operating at a speed which corresponds to the intersection of the $T_{Load}$ torque line and the $I_{F3}$ torque/speed characteristic indicated at point A. If $T_{Load}$ represents a torque requirement for a vehicle being driven by rotation of armature 12, and that vehicle came upon a slight incline which requires more torque to maintain the same speed, then the speed would begin to drop and the torque would begin to increase to the right along the torque/speed characteristic $I_{F3}$. By the same token, if the vehicle started down a slight incline so that the driving torque for the specified speed lessened, then the speed would begin to increase and follow the torque/speed characteristic $I_{F3}$ to the left. If the incline was such as to cause the speed of the vehicle to increase to such a value that the torque became negative, then the motor would begin to operate in the generator mode forcing reverse current through the battery 10 and developing a braking torque. Operation in this region is generally referred to as regenerative braking.

Considering the case in which a vehicle is operating on a level with a constant torque load on the motor armature 12, if it is desired to increase the vehicle speed by accelerating to the intermediate step represented by the characteristic $I_{F2}$, the contacts 24 are opened so that the resistor 20 is inserted in series with the field winding 14. Since the speed of the vehicle could not change significantly during the time that the field current changed from the value represented by the characteristic $I_{F3}$ to the value represented by the characteristic $I_{F2}$, it will be appreciated that while moving at substantially a constant speed, the torque would suddenly jump from point A to a point B on the $I_{F2}$ characteristic. Since the point B represents more torque than is required by the load $T_{Load}$ the rotational velocity of armature 12 and thus the speed of the vehicle will accelerate in accordance with the $I_{F2}$ until the torque level is again balanced. At this time the motor is operating at a speed indicated at point C on the $I_{F2}$ characteristic. If it is desired to increase the vehicle speed further, the contactor 26 is opened thereby placing the series combination of resistor 20 and resistor 22 in series circuit with the field winding 14 to further decrease current. Torque again increases abruptly at substantially constant speed to intersection point D on the $I_{F1}$ torque/speed characteristic. Armature velocity and vehicle speed then gradually increase until the torque is again balanced and operation stabilizes at point E on the $I_{F1}$ characteristic.

If the system were operating at point E and it were desired to slow the vehicle, the contactor 24 could be closed thereby removing all resistance from in series with the field 14 and causing a rapid transition from the $I_{F1}$ torque/speed characteristic to the $I_{F3}$ characteristic at point F. Since point F is in the generator region, the armature 12 is being driven by the vehicle, counter EMF is greater than the potential of battery 10 and current is forced back into battery 10. Armature velocity will follow the $I_{F3}$ torque/speed characteristic, gradually slowing the speed of the vehicle to the point A.

Much smoother transitions between different torque/speed levels can be obtained by replacing the resistor-contactor arrangements with continuous regulating circuits. Systems are known, for example, in which two chopper circuits have been employed, one in series with the armature of the motor and a second in series with the motor field winding to provide individual control of both armature and field currents. However, these types of systems require two separate controls and two separate power circuits for regulating current. Accordingly, such systems tend to be uneconomical.

Figure 3:
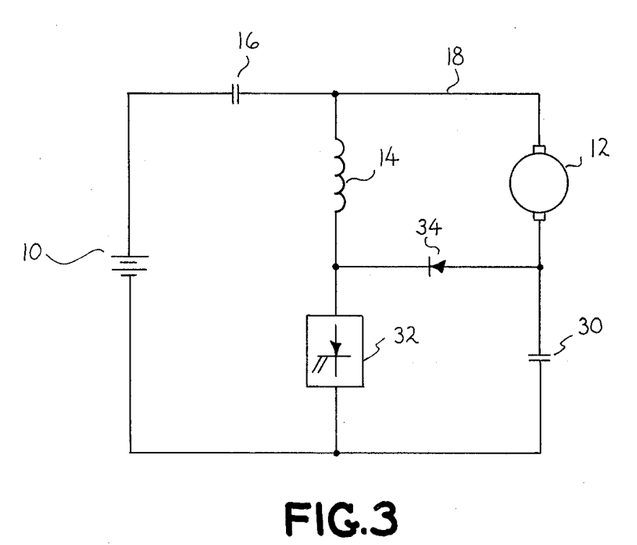
FIG. 3 is a simplified partial schematic diagram of one form of the present invention.

Referring now to FIG. 3, there is shown one form of power control system constructed in accordance with the present invention in which the battery 10 is connected to supply power to the DC motor comprising armature 12 and field winding 14, which motor is controlled by a single power regulator circuit 32 connected between the second terminal of winding 14 and the negative voltage terminal of battery 10, thus replacing the resistor-contactor arrangement of FIG. 1. A junction intermediate the armature 12 and contacts 30 is connected by means of a diode 34 to a junction intermediate the field winding 14 and regulator circuit 32. In essence, the armature 12 is connected in parallel with the field winding 14 by means of the diode 34. The regulator circuit 32 may be a time-ratio control circuit or chopper of a type well known in the art and may be either a thyristor with associated commutating circuit or transistor with associated gating circuit. An exemplary chopper circuit is shown, for example, in U.S. Pat. No. 3,927,357 issued Dec. 16, 1975, and assigned to the General Electric Company.

As will be appreciated, the regulator circuit 32 replaces the resistors 20 and 22 of the prior art circuit while providing for continuous control over the current regulating range. In addition, since the regulator circuit 32 is also connected in a series current path for the armature 12, in a first mode of operation regulator circuit 32 also controls start-up current in armature 12. Once the regulator circuit 32 has been brought up to a full conduction mode of operation such that essentially all of the battery voltage is applied across the motor armature 12, the contacts 30 are closed thereby connecting the armature 12 directly across the battery 10. In a second operational mode the regulator circuit 32 thereafter controls only the current through field winding 14 and thus regulates motor speed (torque) by field current control. The diode 34 effectively isolates the armature 12 and field winding 14 when the contacts 30 are closed.

The power control circuit illustrated in FIG. 3 is most advantageously used in a vehicle having a variable gear ratio transmission with at least two gear ratios available. The vehicle would start out in a first gear ratio accelerating the motor armature 12 up to its maximum speed under full armature voltage and full field current. At this point contacts 30 are closed thereby connecting the armature 12 directly across the power source, e.g., battery 10. The regulator circuit 32 then gradually phases back to weaken or reduce the field excitation applied to field winding 14 to thereby increase the speed of the armature 12 above its base speed as was described previously with respect to FIG. 2. Typically, the control speed range using field current control will permit the speed to be increased about twice the speed at full field current. If it is then desired to increase the vehicle speed above this maximum speed obtained in the first gear ratio, the transmission can be shifted into the second gear ratio. However, in order to facilitate the gear shifting, just prior to shifting the regulator circuit 32 is brought to a higher conduction rate to increase the level of field current thereby increasing the generated field flux and causing the counter EMF of the armature 12 to increase above the voltage of battery 10. This action reduces the generated torque of the motor so that the gears are relaxed to facilitate shifting. Once the gears have been shifted, the regulator circuit 32 is gradually phased back to reduce the field current and again accelerate the vehicle.

Figure 4:
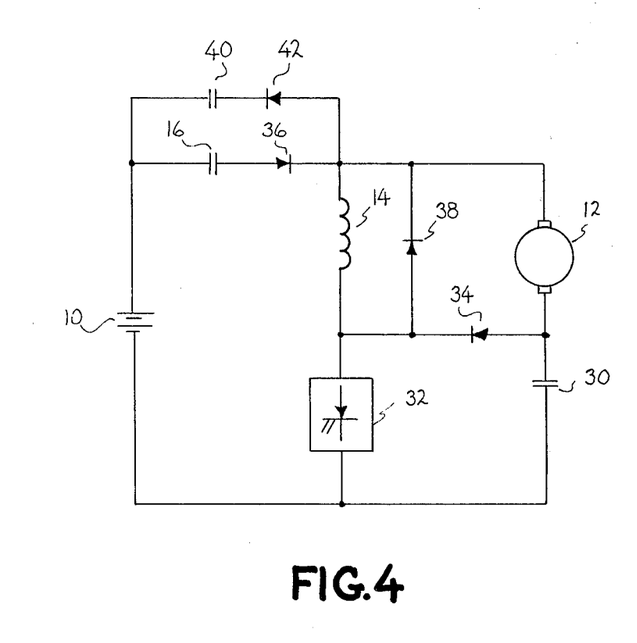
FIG. 4 is a partial schematic and simplified diagram of an alternate form of the present invention.

It will be appreciated that increasing the level of field excitation to thereby increase the counter EMF generated by the armature 12 may result in current being generated by the armature 12 which will tend to force the motor into a regenerative braking mode. Since this, in effect, creates a negative torque on the vehicle transmission, very precise control of the level of flux in the motor would have to be provided to assure that the generated counter EMF only matches the voltage potential of battery 10 such that the motor torque approaches zero. An alternative to precise control of the regulator circuit 32 is shown in FIG. 4 in which a blocking diode 36 is connected in series with the contacts 16. This blocking diode 36 prevents power from flowing from the motor armature 12 to the battery 10 and assures that the motor is in a coasting state and developing no torque when the field excitation is increased preparatory to shifting gear ratios. FIG. 4 also shows a free wheeling diode 38 which provides a current path for the inductive current in field winding 14 whenever the regulator circuit 32 is non-conductive. An additional set of contacts 40 and a series connected diode 42 are shown connected in parallel with the contacts 16 and diode 36. The contacts 40 and diode 42 are utilized in the event that it is desired to provide regenerative braking for the armature 12. During regenerative braking the contacts 16 would be opened and the contacts 40 closed so that the current path for current from the armature 12 to the battery 10 would be through diode 42 and contacts 40. The diode 42 serves essentially the same function as diode 36, i.e., it prevents current from flowing from the battery 10 to the motor armature 12 when it is desired to down shift from a high gear to a lower gear during regenerative braking. Thus, the diode 42 allows gear shifting to occur with zero torque on the motor armature 12.

Figure 5:
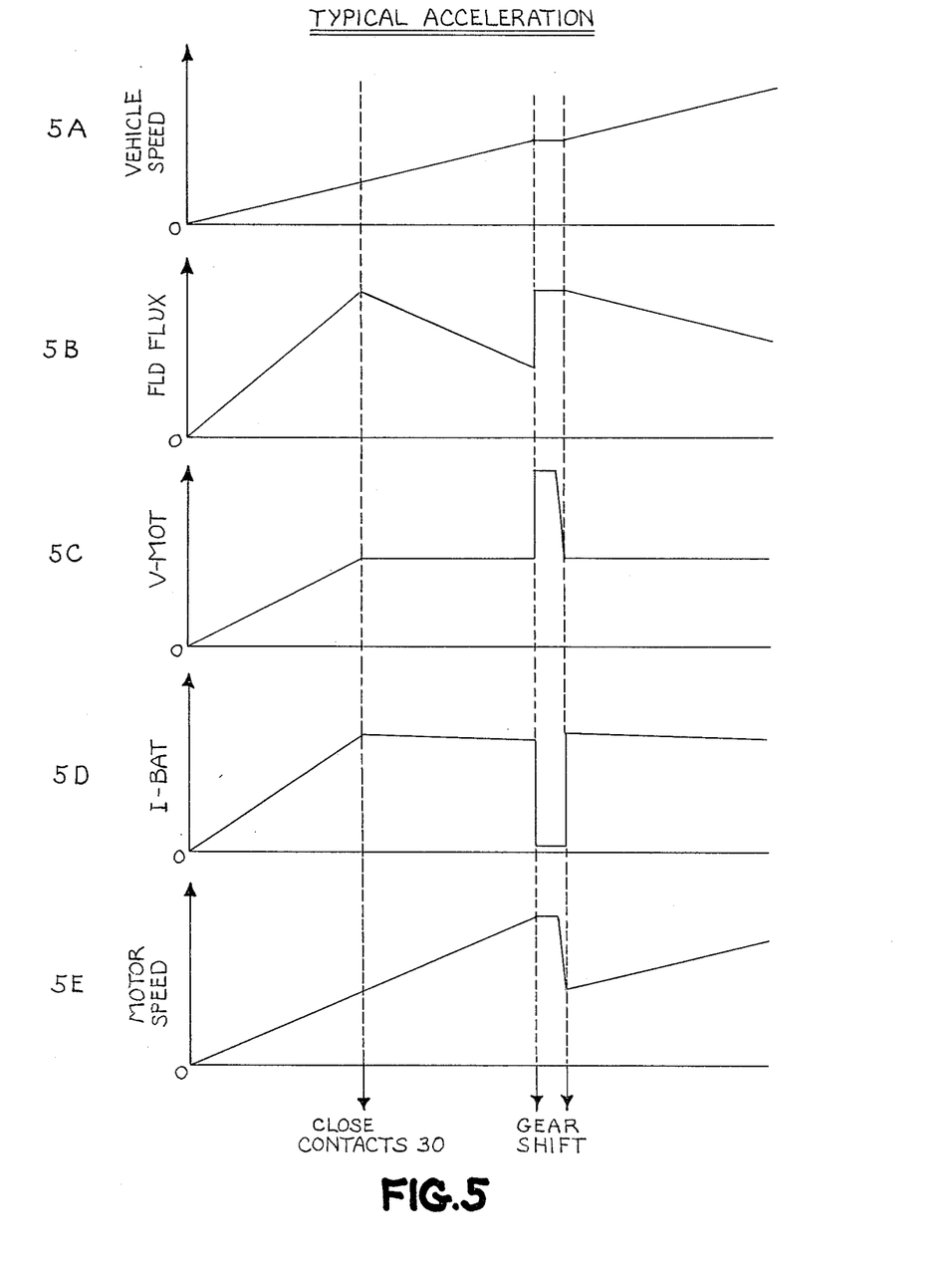
FIG. 5 is a set of graphs representing operation of the circuit of FIG. 4 in an acceleration mode.

For a better understanding of the inventive circuit illustrated in FIG. 4, reference may now be had to the characteristic curves of typical vehicle speed, field flux, motor terminal voltage, battery current and motor speed illustrated in FIG. 5 comprising the FIGS. 5A through 5E. The charts in FIG. 5 illustrate these characteristics during an interval in which the vehicle is accelerated in the minimum amount of time. FIG. 5A represents a graph of vehicle speed versus time and illustrates a uniform acceleration from zero speed up to the point at which it is desired to shift gears. During the actual gear shift, the vehicle coasts so that there may be a slight negative acceleration prior to engaging the second gear ratio. Following engagement of the second gear ratio, the vehicle again accelerates at a uniform rate.

The graph of motor field flux versus time in FIG. 5B illustrates that the field flux increases substantially linearly from zero up to one hundred percent, i.e., to full excitation, at which point the contacts 30 are closed. Thereafter the field excitation is reduced and the flux accordingly decays down to about a fifty percent level. Since the fifty percent level represents a minimum desired operational field excitation, it is at this point that it is necessary to shift into a higher gear for an increase in speed. In order to facilitate gear shifting without any great surge in power, the field flux is rapidly increased to its maximum value by increasing the field current, thereby increasing the generated armature voltage above battery voltage so that the diode 36 blocks power flow from the battery to the motor armature 12 and forces the armature 12 into a coasting state whereby no torque is developed. As can be seen, the motor field flux is at substantially one hundred percent during the gear shifting time. Once the higher gear has been engaged, the motor speed quickly decays back down to a speed dependent upon the change in gear ratio, which speed is usually selected by choice of gear ratio such that the motor still has a greater generated voltage than the battery voltage whereby after the transition there is still no power flow from the battery into the motor. Once the gear shifting has been accomplished, a signal from the transmission to the control provides for resumption in regulated current for more continued acceleration, i.e., the current regulator 32 begins to reduce the field current so that motor counter EMF begins to drop and current again flows through the armature 12 to continue the acceleration through the desired increase in speed.

FIG. 5C illustrates motor terminal voltage over the acceleration interval. As illustrated, the armature terminal voltage rapidly increases from zero up to battery voltage at which point the contacts 30 are closed. From then until gear shift interval the armature voltage remains constant and equal to battery voltage. At the time that gear shifting occurs, field flux is increased (as shown in FIG. 5B) which causes a rapid increase in armature terminal voltage to a level approaching twice the battery voltage. As described previously, this action reduces the generated torque of the motor so that gear shifting can occur while the motor is not loaded. After the gear shift interval the motor field flux is reduced causing the armature terminal voltage to rapidly decay back to the battery voltage level and allowing acceleration of the motor to occur.

FIG. 5D represents a plot of battery current over the acceleration interval. When the regulator circuit 32 is first energized the battery current increases relatively constantly up to the full field, maximum armature current level, at which level the contacts 30 are closed. Since field current is reduced to increase speed after this level, there is a slight decrease in battery current between the closing of contacts 30 and the time that the gear shifting occurs. During the gear shift interval battery current is reduced to substantially zero since the diode 36 is reversed biased by the higher counter EMF of the armature 12. At the end of the gear shift interval battery current again increases to its maximum value and then decreases slightly over the acceleration interval as field current is gradually reduced.

In FIG. 5E a plot of armature velocity is illustrated. The actual armature velocity increases from zero substantially linearly until the gear shift interval. This, of course, follows the fact that vehicle speed in FIG. 5A also increases substantially linearly. During the gear shift interval the motor speed is at first held relatively constant simply because the motor armature is free wheeling without any load torque applied. As soon as the second gear is engaged and load reapplied, the actual motor speed decays rather suddenly to a value determined by the vehicle speed and the selected gear ratio. Field weakening after the gear shifting interval then causes the motor speed to increase again at a fairly linear rate. Each of the linear rates indicated in the graphs in FIG. 5 resulted from the assumption that the current regulator 32 provided a substantially linear control of field current in response to a demand for constant accelertion of the associated vehicle on level terrain.

Figure 6:
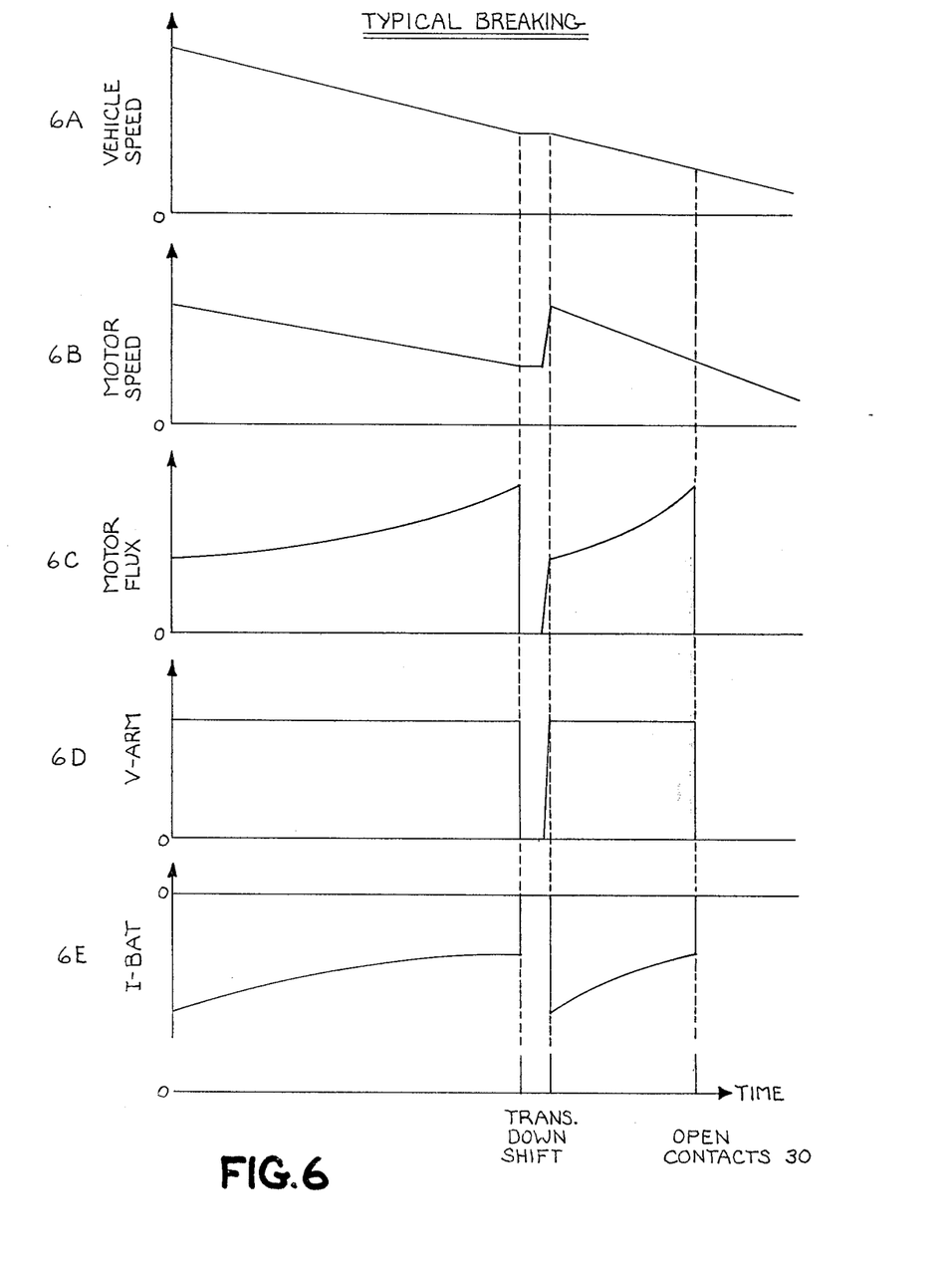
FIG. 6 is a set of graphs representing operation of the circuit of FIG. 4 in a braking mode.

Referring now to FIG. 6 comprising the FIGS. 6A through 6E, there is illustrated a set of curves for a typical braking interval in a vehicle utilizing the system of FIG. 4. Two events during this braking interval are of interest. These events are the point at which the transmission is downshifted and the point at which the contacts 30 are opened. At the beginning of the braking interval, assuming the vehicle speed is at a maximum level, motor speed is also at a maximum value, motor flux is at its minimum value in order to reach the maximum speed, armature voltage is held at battery voltage since the contacts 30 are closed, and battery current is at a value determined by the motor speed and type of motor in use. To initiate braking, field current is increased slightly as indicated by the increase in motor flux in FIG. 6C so that the counter EMF generated by armature 12 rises above battery voltage and reverse current begins to flow from the armature 12 to the battery 10. During this interval also the contacts 40 are closed and the contacts 16 are opened so that the current path to the battery is available. With the contacts 40 closed, motor flux is allowed to increase above its minimum value to a level permitting the maximum value of motor current to be generated and supplied to the battery 10. The current regulator 32 adjusts the current in field winding 14 to the value which corresponds to the desired braking torque by increasing the field current as the speed is decreased, eventually reaching the point of maximum field current. If motor speed continued to drop below this value, the motor would begin to develop driving torque (in the absence of diode 42). With diode 42 connected in the series circuit between the armature 12 and battery 10, the motor is forced to be in the coasting state so that down shifting of the transmission is necessary to increase the motor speed whereby regenerative braking is possible. If motor field current were left at a high value during gear shifting, then when the motor is rapidly accelerated due to the transmission gear change, there would be a very large surge of current resulting from the increase in generated counter EMF. Before down shifting, therefore, field current is dropped to a relatively low level reducing the armature voltage below battery voltage and reverse biasing the braking diode 42 thus blocking all current flow. Once the gear shift has been accomplished and the transmission re-engaged so that the armature 12 is now accelerated up to its maximum value, as indicated by the graph of FIG. 6B at the end of the transmission down shift, and the field flux has been dropped to a low level by reducing the conduction of current regulator 32, the current regulator 32 is again switched back into the circuit and field current is increased to resume reverse current flow. Braking then continues until the point which corresponds to base speed, i.e., the point at which field current and armature current are both at their maximum values. If motor speed tends to drop below base speed, the motor characteristics shift the motor operating point into the motoring region in an attempt to prevent braking. Accordingly, at this point it is preferable to disconnect the motor from the circuit to allow the mechanical brakes to accomplish the rest of the braking interval. By utilization of the diode 42, there is no need to actually sense the base speed point since motoring is prevented by the current blocking action of diode 42.

Figure 7:
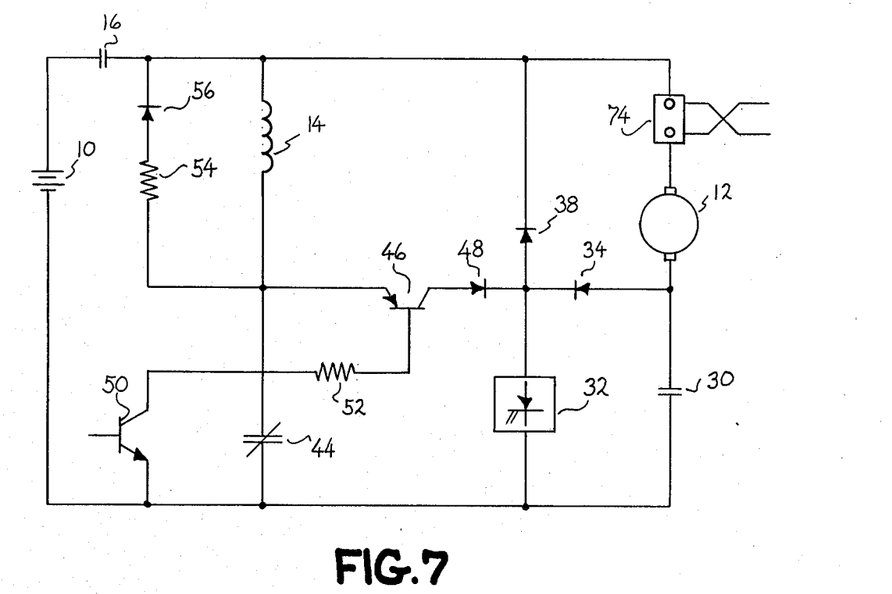
FIG. 7 is a partial schematic diagram of a preferred form of the present invention; and, FIG. 8 is a simplified block diagram of a regulating system for use with the power control system of the present invention.

Referring now to FIG. 7 there is shown an alternate form of the present invention incorporating variable field control with fixed armature voltage and in also variable armature control under fixed field voltage. In addition to the elements previously described, the embodiment of FIG. 7 includes additional contacts 44 connected between the second terminal of field winding 14 and the negative voltage terminal of battery 10. In order to simplify operation of the circuit, the contacts 44 are preferably normally closed contacts so that battery voltage can be applied across the field winding 14 as soon as the contacts 16 are first closed. A transistor 46 and series connected diode 48 are inserted between the terminal of field winding 14 and the regulator circuit 32. A control transistor 50 has a collector terminal connected through a resistor 52 to a gate terminal of transistor 46. The transistor 50 provides control signals to force transistor 46 into and out of conduction. A resistor 54 and diode 56 are also connected in a series current path in parallel with the field winding 14. Although it is preferable that contacts 44 and contacts 30 be electromechanical contacts in order to minimize their respective voltage drops when closed, other switching devices such as thyristors could be used instead.

In the operation of the circuit illustrated in FIG. 7, when the contacts 16 are closed, full battery voltage is applied to the motor field winding 14 by virtue of the normally closed contacts 44. The diode 48 is reverse biased since its anode is connected to the battery negative voltage through the contacts 44. Accordingly, the regulator circuit 32 is isolated from the field winding 14. The mark space ratio, i.e., the conduction time ratio, of the regulator circuit 32 is varied in accordance with the torque demanded of the drive circuit. The regulator circuit 32 is this mode of operation controls the magnitude of armature current. When the armature velocity reaches a speed where continuous conduction, i.e., 100 percent on-time, of regulator circuit 32 is required to obtain the desired armature current, the system reverts to field current control by closing the contacts 30 and opening the contacts 44. Since the transition from armature control to field current control is accomplished while the regulator circuit 32 is fully conductive, the contacts 30 and 44 can close and open respectively without arcing.

It should be noted that for field current control a regulating system (not shown) must supply a gating signal to transistor 50 to maintain it in conduction so that transistor 46 is maintained in conduction.

With contacts 30 closed, the normal low voltage drop across the regulator circuit 32 causes the diode 34 to be reverse biased. In addition, since contacts 34 are now open, the field current path is through the transistor 46, diode 48 path and the regulator circuit 32. Thus, the mark space ratio of regulator circuit 32 now controls the field current and the system operates in the field control mode. The mark space ratio of the regulator circuit 32 is gradually decreased so that the flux generated by the field winding 14 is progressively weakened to maintain the desired motor torque and increase the speed of the vehicle.

As previously discussed, when field flux has been reduced to its minimum permissible value, no further increase in speed is possible without a change in gear ratio. For a vehicle incorporating an electrically controllable clutch and a transmission, the gear ratio change may be accomplished by disengaging the clutch and strengthening the field current to increase the machine flux in the same proportion as the desired gear change ratio. The rate of change in field current may be controlled through the regulator circuit 32 in such a manner as to regulate the regenerative armature current to a prescribed value to thus decelerate the motor in order to synchronize gears for meshing. Once the flux change has been accomplished, the gear shift can be completed and the clutch re-engaged.

Should the load exceed torque capability in the field control range while operating in a high gear, such as might occur when traveling up an incline, the vehicle will begin to decelerate. During such a deceleration caused by an increase in torque load, the field current must be continually increased to maintain armature current at a maximum value. Eventually a speed point will be reached where maximum field current is necessary and, should the speed decrease further, the armature current would exceed the maximum permissible value. At this point a down shift of gearing is necessary. However, should the vehicle already be employing its lowest gear ratio, then the circuit must revert to armature control.

The sequence of events for down shifting under load would be to disengage the clutch and reduce the field current sufficiently to provide the driving torque required for acceleration of the motor to the higher speed necessary to syncronize the gear shifting. As was described with respect to up shifting, down shifting requires that the motor speed-change ratio equal the change in gear ratio to minimize torque disturbances when shifting. Although the rate of decay in machine flux may be controlled to regulate the armature current during the period when a motor is being accelerated to the synchronizing speed, in the general case, the natural rate of decay in field flux due to field inductance may be too long resulting in an unacceptable delay in shifting of gear ratios. The transistor 50 and transistor 46 permit variation in the rate of field flux decay. More particular, normally with transistor 46 in a conducting mode, a free wheeling path is formed around the field winding 14 through the transistor 46, diode 48 and free wheeling diode 38. However, if it is desired to accelerate the rate of decay of field flux, the transistor 50 may be gated off which in turn gates off the transistor 46 and opens the free wheeling path through the diode 38. Although the free wheeling path through diode 38 is preferable since it allows the field current to decay at its natural rate minimizing ripple during pulse control of field current, when the field must be reduced rapidly, switching off the transistor 46 forces the free wheeling current through the resistor 54 and diode 56 path. The resistor 54 varies the L/R time constant to force a more rapid decay of field current. Therefore, the time required for the desired reduction in field flux can be decreased to improve the gear shifting response.

Figure 8:
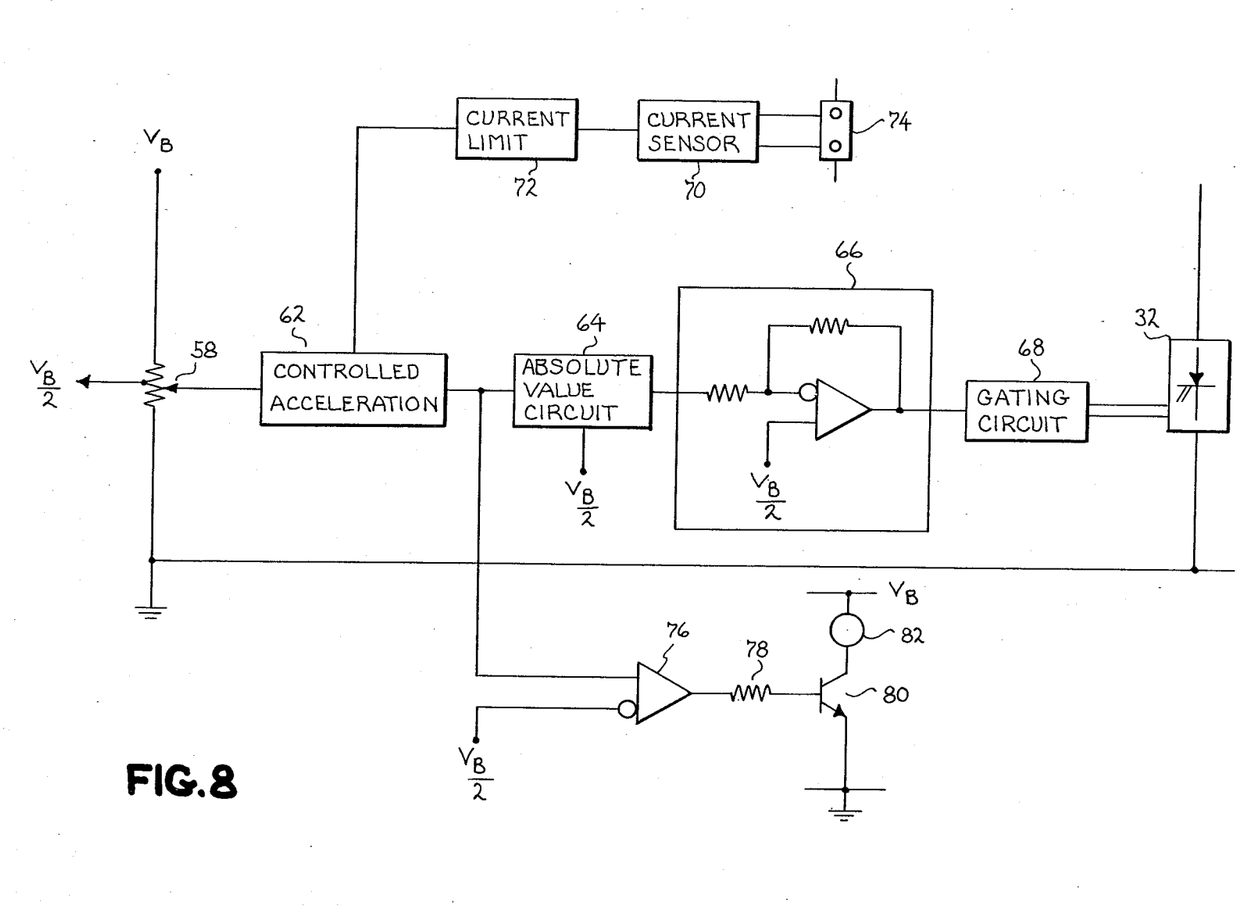

Referring now to FIG. 8 there is shown one form of electronic regulating system suitable for controlling the operation of applicant's inventive power control system. A potentiometer 58 representative of an accelerator control for vehicles is connected between a ground reference bus 60 and a source of regulated potential $V_B$. The variable output of the potentiometer 58 is connected as an input signal to a controlled acceleration circuit 62. The controlled acceleration circuit acts as an integrator to provide a ramp function control signal and to prevent sudden voltage transients occasioned by rapidly depressing or releasing the accelerator connected with the potentiometer 58. An output signal developed by the controlled acceleration circuit 62 is applied as an input signal to an absolute value circuit 64 of a type well known in the art, such as for example, that illustrated on page 59 of the text Applications Manual for Operational Amplifiers published by Philbrick/Nexus Research of Dedham, Mass. in 1968.

An output signal developed by the absolute value circuit 64 is coupled to a unity gain inverting amplifier circuit 66 in the form of an operational amplifier biased at a voltage at the midpoint of the peak voltage available from the potentiometer 58, i.e., a voltage $V_{B/2}$. The purpose of the absolute value circuit 64 in conjunction with the inverting amplifier 66 is to provide an output signal from the amplifier circuit 66 which increases from its minimum value when potentiometer 58 is at its minimum value, peaks when the potentiometer 58 is centered and then thereafter decreases back towards a minimum value as the signal from potentiometer 58 is further increased. As will be apparent, this operation is necessary since it is desired to increase the conduction of regulator circuit 32 to its maximum value when potentiometer 58 is centered, and thereafter to provide a weak field condition for increased speed by decreasing the conduction of the circuit 32.

The output signal developed by the amplifier circuit 66 is coupled to a gating circuit 68 which thereafter provides gating signals to the regulator circuit 32.

Since the control system is essentially a feedback control system, there is also provided a current sensor 70 connected to sense armature current and to provide an output signal proportional thereto to a current limit circuit 72. The signal developed by the current limit circuit 72 is fed back into the controlled acceleration circuit 62. A detailed description of the current sensor circuit 70, current limit circuit 72 and controlled acceleration circuit 62 may be had by reference to U.S. Pat. No. 3,868,554 issued Feb. 25, 1975, and assigned to the General Electric Company. The current signals for the current sensor circuit 70 are provided by a current shunt 74 shown in FIG. 7 connected in a series circuit with the armature 12.

In order to control the sets of contacts 30 and 44, the output signal developed by the controlled acceleration circuit 62 is applied to a comparator circuit 76 which comparator circuit compares the midpoint voltage of the potentiometer 58 to the output signal from the controlled acceleration circuit 62 and provides an energizing signal through a resistor 78 to a gate terminal of a transistor 80 when the controlled acceleration signal indicates that potentiometer position is higher than its midpoint value. The transistor 80 is connected in a series circuit with an energizing coil 82 of the contacts 30 and 44 between the positive and negative terminals of the battery 10. As will be apparent, in a preferred embodiment the single energizing coil 82 may be utilized to control the normally open contacts 30 and the normally closed contacts 44 in the power control circuit of FIG. 7, i.e., the contacts 30 and 44 are separate contacts within a single contactor assembly. The regulating system of FIG. 8 is suitable for use with a single gear ratio system. If multiple gear ratios are required, transmission shift signals would be required, including signals to the acceleration circuit 62 to reset it to its midpoint value for continued acceleration. Since implementation of such functions depend upon the particular circuits in use and are believed obvious to those having skill in the art, the details of such implementations are not shown.

Figure 9:
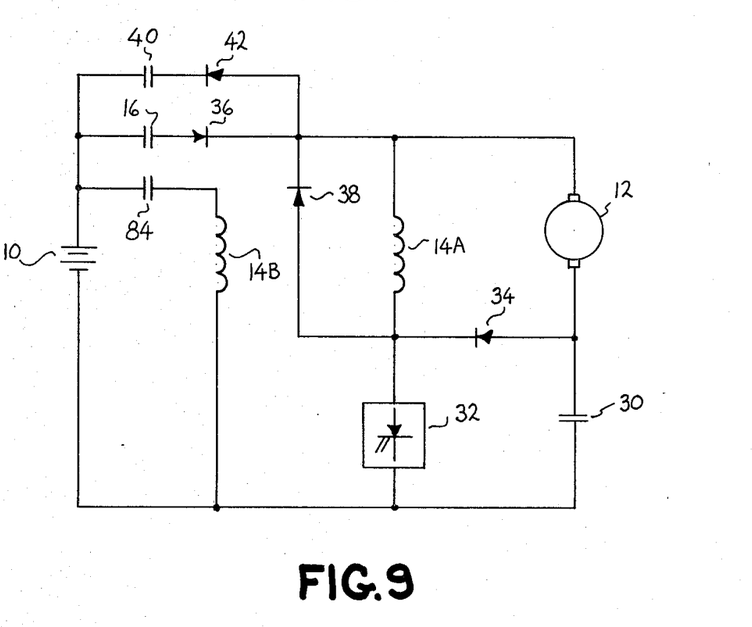
FIG. 9 is a simplified schematic diagram of an alternate embodiment of the present invention.

Referring now to FIG. 9 there is shown a still further embodiment of the present invention in which the motor field winding 14 is separated into two components. A first component 14A of the motor field winding 14 is connected in the same manner as described previously. A second component 14B of the motor field winding 14 is, however, connected by means of contacts 84 directly across the battery 10. In a typical arrangment the field winding component 14B may represent 30 percent of the total field winding 14. The use of a split field winding assures that a minimum level of field flux is maintained in the motor at all times and helps in minimizing armature in-rush current at startup or during gear shifting.

As will be appreciated, the power control system described herein provides a method and apparatus for controlling the operation of a DC electric motor employed in a vehicle using only a single power regulating circuit to control both armature and field current. While there is shown and described what is presently a preferred embodiment of the invention, it will be obvious to those skilled in the art that various modifications may be made without departing from the spirit and the scope of the invention. It is intended therefore, that the invention not be limited by the illustrative embodiments but that the appended claims be given full consideration in defining the breadth of the invention.

What is claimed is:

1. A power control system for a DC electric motor having an armature and a field winding each adapted to be energized from a DC power source, the system comprising:
   (a) controllable power regulating means;
   (b) means for connecting said power regulating means and the motor field winding in a series current path with the DC power source;
   (c) normally open first switch means;
   (d) means for connecting said first switch means and the motor armature in a series current path with the DC power source;
   (e) component means for connecting a junction intermediate the motor armature and said first switch means to a junction intermediate the motor field winding and said regulating means whereby the series combination of motor armature and said component means is connected in a parallel current path with the motor field winding; and
   (f) control means for varying the conduction of said power regulating means to thereby increase or decrease current through both the armature and the field winding substantially simultaneously in a first operational mode, said control means including means for actuating said first switch means when the voltage on the armature attains a predetermined value and for thereafter regulating current only through the field winding in a second operational mode while maintaining actuation of said first switch means.

2. The power control system as defined in claim 1 wherein the means for connecting said first switch means and the motor armature in a series current path with the DC power source includes a second switch means connected in series with a first diode, said first diode being poled so as to block current flow when armature voltage exceeds the voltage potential of the DC power source.

3. The power control system of claim 2 and including a series combination of a third switch means and second diode connected in a parallel current path with said second switch means and said first diode, said second diode being poled so as to block current flow from the power source to the motor armature when the power control system is in a regenerative braking mode of operation and the potential of the power source exceeds the counter EMF of the motor armature.

4. The power control system of claim 1 wherein said means for connecting said power regulating means and the motor field winding in a series current path comprises:
(a) normally closed field switch means;
(b) a blocking diode, said field switch means and said blocking diode being connected in said series current path between one terminal of the motor field winding and one terminal of said power regulating means;
(c) a first free wheeling diode connected between said one terminal of said power regulating means and another terminal of said motor field winding;
(d) a resistor;
(e) a second free wheeling diode, said second free wheeling diode and said resistor being connected in a series current path between said one terminal of said motor field winding and said other terminal of said motor field winding; and
(f) means for selectively opening said second switch means to force current through said resistor and said second free wheel diode to thereby rapidly reduce motor field flux.

5. The power control system as defined in claim 4 and including a normally closed contactor connected between said one terminal of said motor field winding and one terminal of said DC power source whereby said motor field winding may be connected in a series current path with said power source.

6. The power control system of claim 4 wherein said second switch means comprises a transistor.

7. The power control system as defined in claim 1 wherein said connecting means between said regulating means and the field winding comprises a diode and said system includes a normally closed field switch means for connecting the field winding and the power source in a series current path.

8. The power control system as defined in claim 1 wherein said component means comprises a diode.

9. The power control system of claim 1 wherein at least a portion of said motor field winding is connected directly across said DC power source.

10. The power control system of claim 1 wherein said power regulating means comprises a time ratio control chopper circuit.

* * * * *